(12) United States Patent
Koravadi (10) Patent No.: US 9,688,199 B2
(45) Date of Patent: Jun. 27, 2017

(54) VEHICLE ALERT SYSTEM UTILIZING COMMUNICATION SYSTEM

(71) Applicant: MAGNA ELECTRONICS INC., Auburn Hills, MI (US)

(72) Inventor: Krishna Koravadi, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 14/636,503

(22) Filed: Mar. 3, 2015

(65) Prior Publication Data

US 2015/0251599 A1 Sep. 10, 2015

Related U.S. Application Data

(60) Provisional application No. 62/001,796, filed on May 22, 2014, provisional application No. 61/947,638, filed on Mar. 4, 2014.

(51) Int. Cl.
| | |
|---|---|
| *B60Q 9/00* | (2006.01) |
| *B60W 30/08* | (2012.01) |
| *B60Q 1/52* | (2006.01) |
| *G08G 1/16* | (2006.01) |
| *G08G 1/0965* | (2006.01) |

(52) U.S. Cl.
CPC ............. *B60Q 9/008* (2013.01); *B60Q 1/525* (2013.01); *B60W 30/08* (2013.01); *G08G 1/0965* (2013.01); *G08G 1/16* (2013.01)

(58) Field of Classification Search
None
See application file for complete search history.

(56) References Cited

U.S. PATENT DOCUMENTS

| | | |
|---|---|---|
| 5,760,962 A | 6/1998 | Schofield et al. |
| 5,786,772 A | 7/1998 | Schofield et al. |
| 5,796,094 A | 8/1998 | Schofield et al. |
| 5,877,897 A | 3/1999 | Schofield et al. |
| 5,929,786 A | 7/1999 | Schofield et al. |
| 5,949,331 A | 9/1999 | Schofield et al. |
| 6,201,642 B1 | 3/2001 | Bos |
| 6,302,545 B1 | 10/2001 | Schofield et al. |
| 6,396,397 B1 | 5/2002 | Bos et al. |

(Continued)

*Primary Examiner* — Leon-Viet Nguyen
(74) *Attorney, Agent, or Firm* — Gardner, Linn, Burkhart & Flory, LLP (57) ABSTRACT

An alert system for a vehicle is provided for alerting an occupant of the vehicle that a pedestrian or bicyclist is approaching the vehicle and may collide with a vehicle door if the door is opened. The alert system includes a mobile communication device carried by a pedestrian or bicyclist and operable to communicate information regarding location and motion of the mobile communication device. A receiver is at the vehicle and receives a communication from the mobile communication device. A processor processes information communicated in the communication. The processor, responsive to processing communicated information, determines whether or not the location and motion of the mobile communication device relative to the vehicle is indicative of a hazardous condition. The alert system, responsive to the processor determining that there is a potential hazardous condition, generates an alert to the occupant of the vehicle.

17 Claims, 6 Drawing Sheets

(56) References Cited

U.S. PATENT DOCUMENTS

| | | |
|---|---|---|
| 6,405,132 B1 | 6/2002 | Breed et al. |
| 6,498,620 B2 | 12/2002 | Schofield et al. |
| 6,523,964 B2 | 2/2003 | Schofield et al. |
| 6,611,202 B2 | 8/2003 | Schofield et al. |
| 6,636,258 B2 | 10/2003 | Strumolo |
| 6,690,268 B2 | 2/2004 | Schofield et al. |
| 6,802,617 B2 | 10/2004 | Schofield et al. |
| 6,806,452 B2 | 10/2004 | Bos et al. |
| 6,822,563 B2 | 11/2004 | Bos et al. |
| 6,882,287 B2 | 4/2005 | Schofield |
| 6,891,563 B2 | 5/2005 | Schofield et al. |
| 6,946,978 B2 | 9/2005 | Schofield |
| 6,975,246 B1 | 12/2005 | Trudeau |
| 7,005,974 B2 | 2/2006 | McMahon et al. |
| 7,038,577 B2 | 5/2006 | Pawlicki et al. |
| 7,145,519 B2 | 12/2006 | Takahashi et al. |
| 7,161,616 B1 | 1/2007 | Okamoto et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,580,795 B2 | 8/2009 | McCarthy et al. |
| 7,592,928 B2 | 9/2009 | Chinomi et al. |
| 7,720,580 B2 | 5/2010 | Higgins-Luthman |
| 7,855,755 B2 | 12/2010 | Weller et al. |
| 7,859,565 B2 | 12/2010 | Schofield et al. |
| 7,881,496 B2 | 2/2011 | Camilleri et al. |
| 2003/0095039 A1 | 5/2003 | Shimomura et al. |
| 2006/0254142 A1 | 11/2006 | Das et al. |
| 2009/0033474 A1* | 2/2009 | Chen ............... B60Q 1/50 340/425.5 |
| 2010/0085171 A1 | 4/2010 | Do |
| 2011/0032119 A1 | 2/2011 | Pfeiffer et al. |
| 2012/0062743 A1 | 3/2012 | Lynam et al. |
| 2012/0065858 A1* | 3/2012 | Nickolaou ............ G08G 1/162 701/70 |
| 2012/0218412 A1 | 8/2012 | Dellantoni et al. |
| 2013/0116859 A1 | 5/2013 | Ihlenburg et al. |
| 2013/0342333 A1 | 12/2013 | Hutchings |
| 2014/0218529 A1 | 8/2014 | Mahmoud |
| 2014/0222323 A1* | 8/2014 | Purushothaman . G06Q 30/0201 701/117 |
| 2014/0375476 A1 | 12/2014 | Johnson et al. |
| 2015/0124096 A1 | 5/2015 | Koravadi |

\* cited by examiner

FIG. 1

40a,b - DSRC Radio
41 - Mobile device
42 - Bike rider
43 - Mirror/side camera

FIG. 2

Compact & cost effective DSRC radio with wire connectivity

FIG. 5

Compact & cost effective DSRC radio with bluetooth

VEHICLE ALERT SYSTEM UTILIZING COMMUNICATION SYSTEM

CROSS REFERENCE TO RELATED APPLICATIONS

The present application is related to U.S. provisional applications, Ser. No. 62/001,796, filed May 22, 2014, and Ser. No. 61/947,638, filed Mar. 4, 2014, which are hereby incorporated herein by reference in their entireties.

FIELD OF THE INVENTION

The present invention relates generally to a vehicle alert system for a vehicle and, more particularly, to a vehicle alert system that provides an alert to the driver or passenger of a vehicle when a pedestrian or bicyclist is approaching the vehicle.

BACKGROUND OF THE INVENTION

Communication systems for vehicles may provide for communication between vehicles and/or between a vehicle and a remote server. Examples of such systems are described in U.S. Pat. No. 7,580,795, which is hereby incorporated herein by reference in its entirety. Communication systems for vehicles may provide for communication between vehicles and/or between a vehicle and a remote server.

SUMMARY OF THE INVENTION

The present invention provides a communication and/or alert system or imaging system for a vehicle that communicates with a mobile device of pedestrians or bicyclists to determine proximity of the pedestrian or bicyclist to the vehicle so that the driver of the vehicle may be alerted as to the presence or approach of a pedestrian or bicyclist, such as if the driver or passenger of the vehicle is about to open a vehicle door into the path of the pedestrian or bicyclist. The location and motion information pertaining to the pedestrian or bicyclist is communicated to the vehicle system via a radio device or communication device (such as a smart phone or other mobile device, such as a device having a dedicated short range communication transmitter or transceiver) of the pedestrian or bicyclist. A receiver at the vehicle (such as a dedicated short range communication receiver or radio) receives the communication and a processor (such as a vehicle-based processor at the vehicle and in communication with the receiver) processes the information to determine if a bicycle or pedestrian is approaching the vehicle in a manner that may lead to a potential hazard if an occupant of the vehicle opens a door.

Optionally, the system may utilize one or more cameras (preferably one or more CMOS cameras) to capture image data representative of images exterior of the vehicle, and provides an alert to the driver or occupant of the vehicle. Optionally, if the vehicle is equipped with an exterior camera and a dedicated short range communication (DSRC) radio, then this data could be fused or combined to get more reliable information pertaining to the presence and movement of the pedestrian or bicyclist.

These and other objects, advantages, purposes and features of the present invention will become apparent upon review of the following specification in conjunction with the drawings.

DESCRIPTION OF THE PREFERRED EMBODIMENTS

A vehicle alert system and/or driver assist system and/or object detection system operates to communicate with a mobile device of a pedestrian or bicyclist or the like to determine proximity and/or approach of the pedestrian or bicyclist relative to the equipped vehicle. The system may include one or more cameras that are operable to capture images exterior of the vehicle and may process the captured image data to display images and to detect objects at or near the vehicle and in the predicted path of the vehicle, such as to assist a driver of the vehicle in maneuvering the vehicle in a rearward direction. The system may include an image processor or image processing system that is operable to receive image data from one or more cameras and provide an output to a display device for displaying images representative of the captured image data. The processor may comprise a vehicle-based processor or may be a remote processor or processing system. Optionally, the system may provide a top down or bird's eye or surround view display and may provide a displayed image that is representative of the subject vehicle, and optionally with the displayed image being customized to at least partially correspond to the actual subject vehicle.

Figure 1:
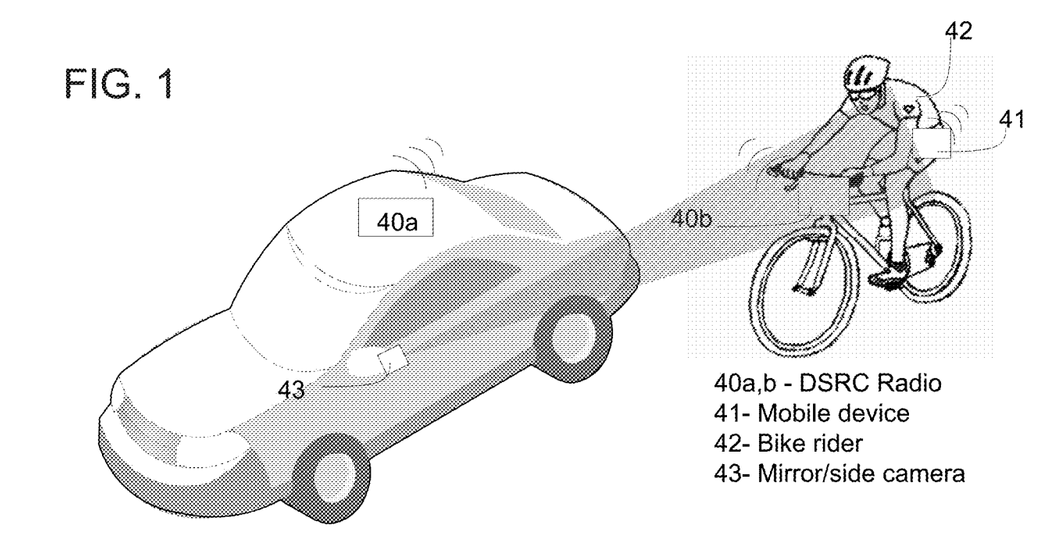
FIG. 1 is a perspective view and schematic of the bicyclist detection system of the present invention.
Figure 2:
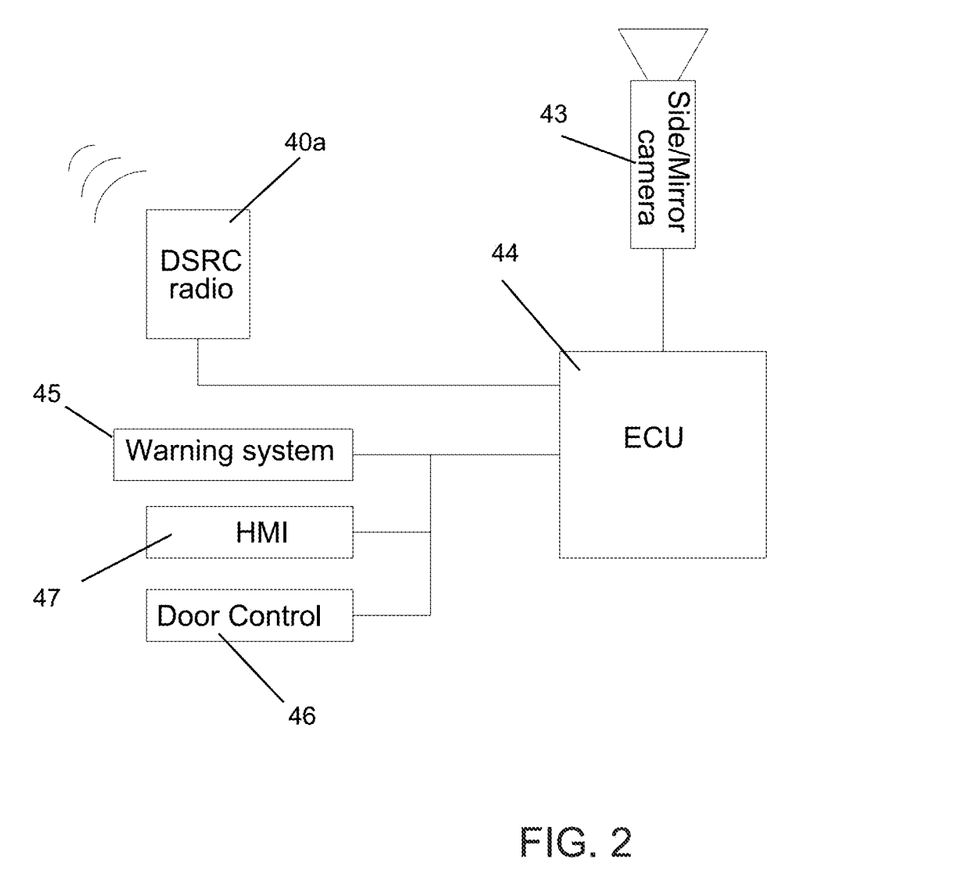
FIG. 2 is a schematic of the bicyclist detection system of FIG. 1.
Figures 3, 4:
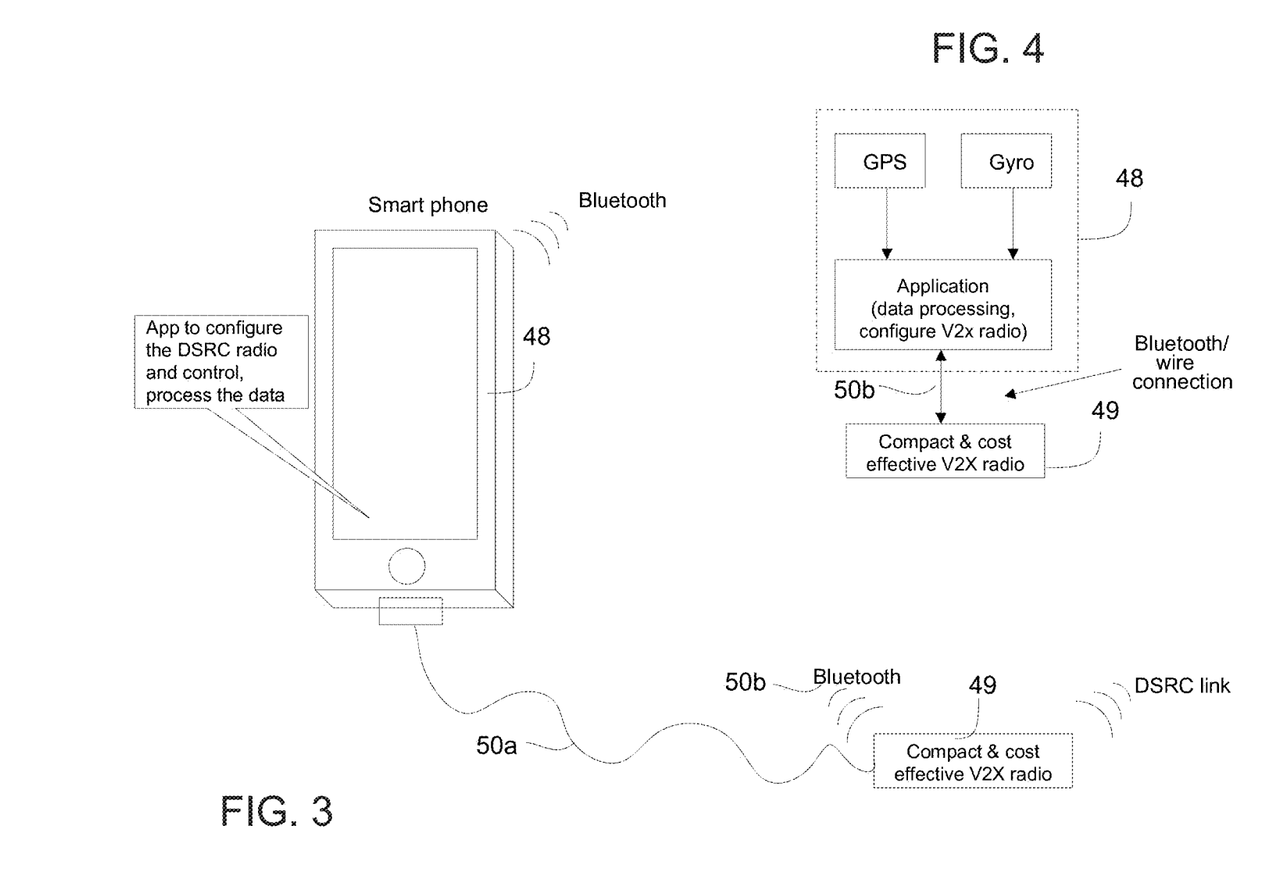
FIG. 3 is a schematic of a radio communication link with a smart phone having an app for communicating to a vehicle equipped with the detection system of the present invention.
FIG. 4 is a schematic of the communication process of the system of the present invention, using the separate radio for the communication.
Figure 5:
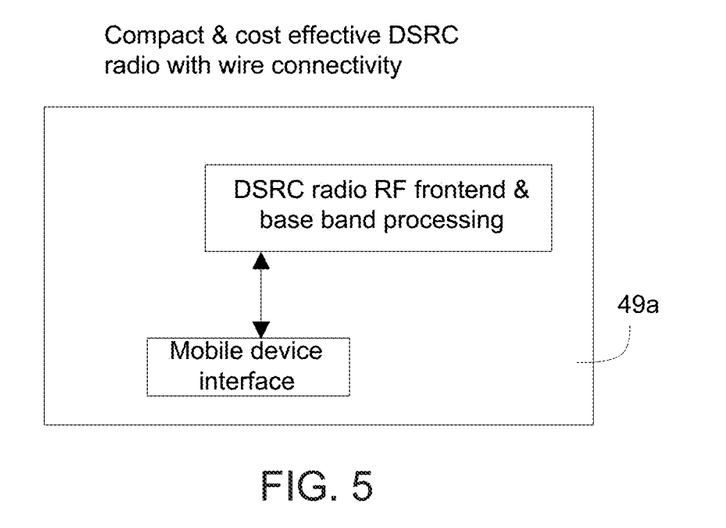
FIG. 5 is a schematic of the radio of FIG. 4.
Figure 6:
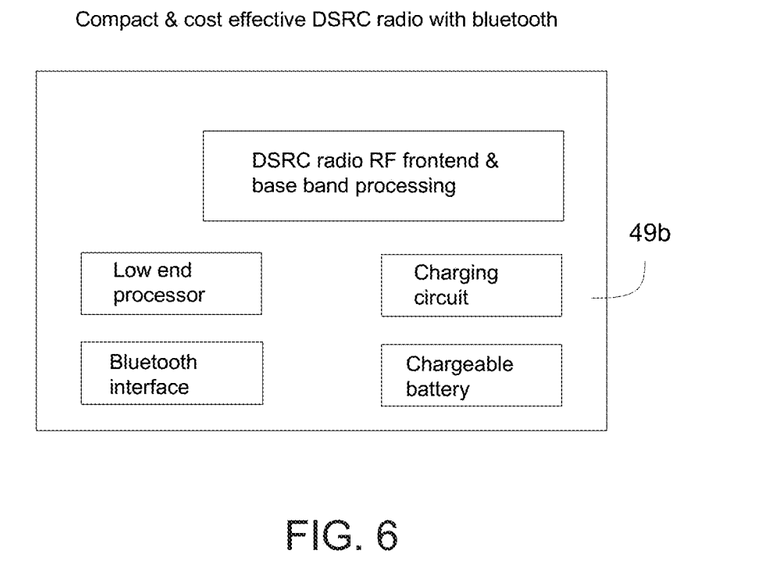
FIG. 6 is a schematic of another radio with a processor and Bluetooth interface in accordance with the present invention.

Referring now to the drawings and the illustrative embodiments depicted therein, a vehicle 10 includes an alert system 12 that includes a communication device (such as a DSRC radio 40a) at a vehicle and a control 44 responsive to the DSRC radio 40a (FIGS. 1 and 2). The DSRC radio 40a receives a communication from a mobile device 41 and/or a mobile DSRC radio 40b, wherein the control processes the received communication information to determine if the mobile device and/or mobile DSRC radio are approaching the subject vehicle in a manner that may lead to a collision with the vehicle door if the door were opened, as discussed below. The system thus determines when a bicycle rider 42 or the like is approaching alongside the vehicle, such as when the vehicle is being parked, and alerts the driver of a potential collision so that the driver will not open the door of the vehicle into the path of the bicycle rider, as also discussed below.

There are several people are killed each year due to collisions between a vehicle door and a bicycle, such as when an occupant of a vehicle opens a vehicle door into the path of a bicyclist and the bicycle rider is tripped out of the bicycle and falls onto the road. When the vehicle is parallel parked in the street, in many countries, the bicycle needs to share the parking space or travel next to the parallel parked vehicle. In many scenarios the driver (or passenger) in the vehicle may not be able to see the bicycle traveling towards the vehicle (such as from rearward of the vehicle and along a side of the vehicle) and he or she may open the door and cause a collision of the door with the bicycle if the door is opened in the path of travel of the bicycle and the bicyclist does not have time to react to avoid the collision (or cannot swerve to avoid the door due to other traffic on the road at which the subject vehicle is parked).

The present invention provides a communication system that communicates to the vehicle system information indicative of the presence or approach of a pedestrian or bicycle at or near the vehicle. If the bicycle rider is equipped with a DSRC radio, collision concerns may be resolved. The DSRC radio could be made very low cost by interfacing with a mobile device of the pedestrian or bicyclist (such as a smart phone or the like) and utilizing the computation power and GPS capabilities of the mobile device.

As shown in FIGS. 1 and 2, the subject vehicle (SV) is equipped with a DSRC radio 40a and it receives the information from the bicycle rider 42 (such as from a mobile device or smart phone 41 of the bicycle rider, which may include a DSRC communication link, or such as from a separate DSRC radio 40b of the bicycle rider) heading towards the SV. Using this information, a door open protection algorithm of a processor or control 44 of the SV is operable to compute the time to collision (TTC) and to alert the driver or occupant (via an alert system or warning system 45 of the vehicle) when he or she tries to open the door. Optionally, if the TTC is within a certain threshold, the system may inhibit the driver or passenger from opening the door (such as via a door control device or system 46 or the like) for a certain period of time and may also alert the driver/passenger about the bicycle hazard, such as by using a human machine interface (HMI) 47 of the vehicle.

If the SV is equipped with a side sensing device, such as a camera or radar or the like (such as a camera 43 at the exterior rearview mirror of the vehicle), the DSRC data communicated and the side camera/radar data captured may be fused or combined to provide a better confidence of a positive determination (so as to limit or reduce false alerts when there is no bicycle present or when there is little or no likelihood of collision).

Because the mobile device 48 (such as a smart phone or tablet or the like) typically has GPS and gyro capabilities (determining location and motion and acceleration and orientation of the mobile device), an application may be developed that may be loaded onto the mobile device to configure and control the DSRC radio (such as shown in FIGS. 3-6). The entire protocol layer could be implemented in the mobile device and a very low cost processer may be used in the DSRC radio for the mobile device interface.

Figure 7:
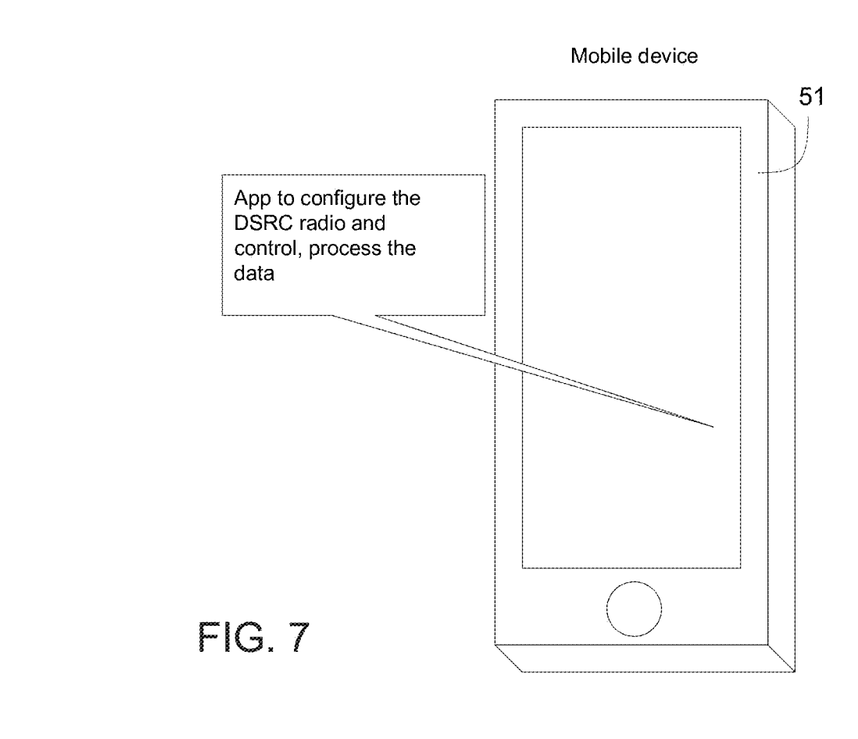
FIG. 7 is a perspective view of a mobile device having an app that includes a V2X radio and that processes data received from the radio in accordance with the present invention.
Figure 8:
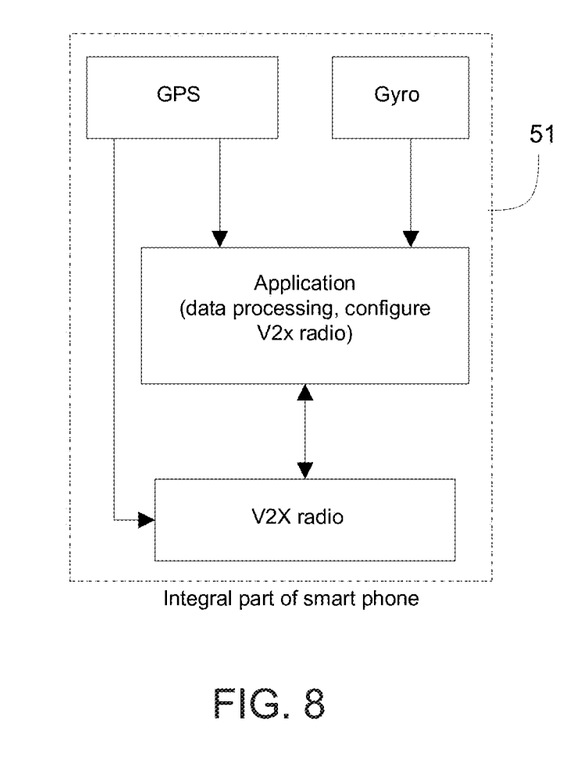
FIG. 8 is a schematic of the mobile device of FIG. 7.

Optionally, and such as shown in FIGS. 7 and 8, a DSRC radio may be included as an integral part of the mobile device 51 to achieve effective pedestrian and/or bicycle detection and protection, such as on public roads in bad weather conditions and/or cross traffic situations.

The mobile device 48 and communication system or links may utilize v2v or v2x communication links or systems to communicate the information (such as location information and motion information, such as speed and direction of travel of the bicycle) to the vehicle system, whereby the system may determine if there is a risk of collision with the vehicle door if the vehicle door is opened. For example, and such as shown in FIGS. 3-6, the mobile device 48 may communicate with a v2x radio 49 or the like. The mobile device may communicate with a v2x radio 49a (FIG. 5) via a wired connection or wired communication link 50a or may communicate with a v2x radio 49b (FIG. 6) via a wireless or BLUETOOTH® communication link 40b or the like. Thus, a person walking or riding their bicycle along the side of the road may carry their smart phone or the like, which communicates their location and movement information (such as via a short range communication protocol) to vehicle communication systems that are in the near vicinity or proximity of the person, whereby the communication systems of the vehicles process the communicated information to determine if the person is at or approaching a door of the respective vehicle and thus to determine if the person represents a potentially hazardous condition if an occupant of the vehicle were to open a vehicle door. The system may be further responsive to one or more accessories or systems of the vehicle, such as a door lock system or the like, and may generate the alert at least in part responsive to a lock condition of the doors (i.e., if the doors are locked, the system may not generate an alert, since the doors are not being opened). The communication systems may utilize aspects of the systems described in U.S. Pat. No. 7,580,795 and/or U.S. Publication Nos. US 2012-0218412 and/or US 2012-0062743, published Mar. 15, 2012, and/or U.S. patent application, Ser. No. 14/169,329, filed Jan. 31, 2014 and published Aug. 7, 2014 as U.S. Publication No. US-2014-0218529, Ser. No. 14/519,469, filed Oct. 21, 2014 and published May 7, 2015 as U.S. Publication No. US-2015-0124096, and/or Ser. No. 14/303,695, filed Jun. 13, 2014 and published Dec. 25, 2014 as U.S. Publication No. US-2014-0375476, which are hereby incorporated herein by reference in their entireties.

Optionally, a communication system of the present invention may utilize a smart phone and radio communication links to track a child at or near a home. At present, child tracking devices are available in the market but are expensive and use GSM communications to track the child, such as when the child is playing around the house. Using a DSRC link, the present invention may provide tracking of a child up to around 1000 meters range for little or no additional cost. At present many homes are equipped with a WiFi/IR enabled remote controlled devices to open the garage door from a vehicle. The system of the present invention may use the DSRC radio installed in the home (for the garage door opening function) for other purposes.

Figures 9, 9B:
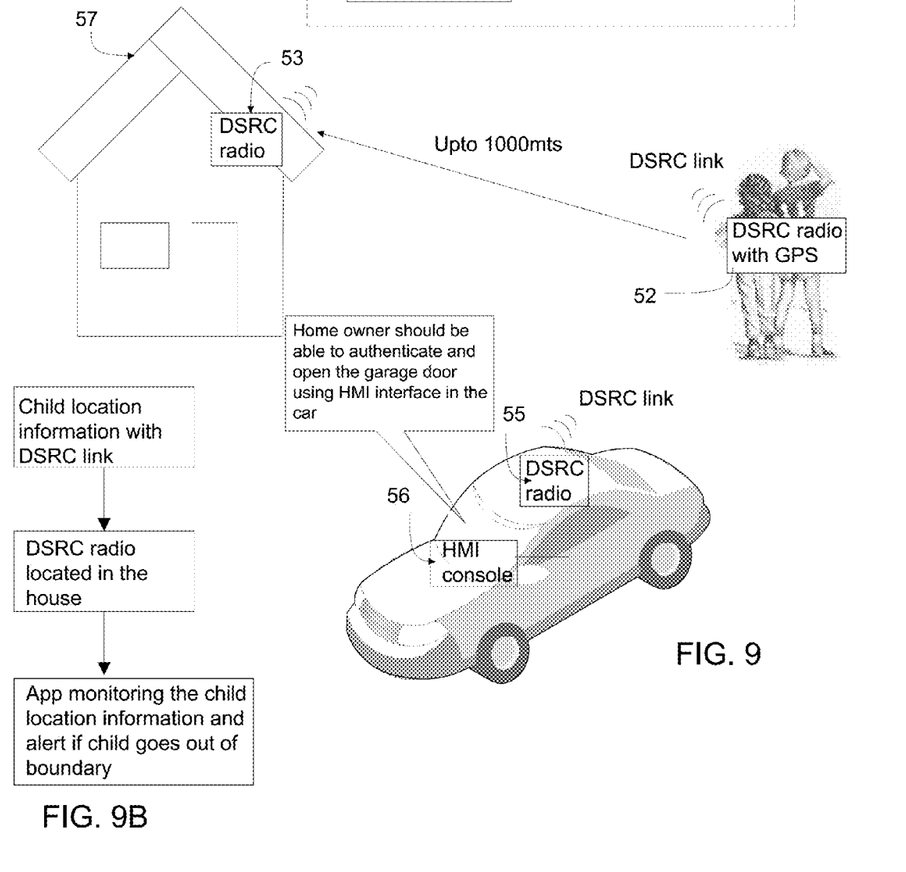
FIG. 9 is a schematic of a home communication system of the present invention, which is operable to track a child at or near the home.
FIG. 9B is a block diagram of the child monitoring and alert process of the home communication system of FIG. 9.
Figure 9A:
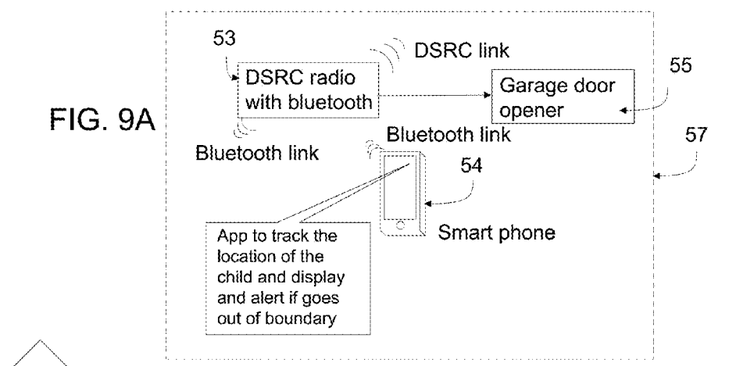
FIG. 9A is a schematic of the devices and communication links of the system of FIG. 9.

For example, and such as shown in FIGS. 9, 9A and 9B, a DSRC radio 53 installed in the home 57 may be multi purposed to track the child as well as open the garage door from the vehicle. The home owner may be able to authenticate and open the garage door by actuating a garage door opener 55 using an HMI interface 56 in the vehicle. A small portable DSRC radio 52 with a GPS wearable device may be attached to a child and the small portable DSRC radio will keep transmitting the GPS position in real time and the DSRC radio 53 installed at the home receives this message and forwards it to a mobile device or smart phone 54 using a BLUETOOTH® link or the like. The mobile app process this data and enables the user to see the position of the child on the map in real time. The mobile app may also provide or generate an alert to the parent if the child tracking device goes out of range or stop transmitting.

As shown in FIG. 9B, the system generates child location information and communicates, via the DSRC link, the child location information to the DSRC radio located in the house. The app (on the mobile device or smart phone) monitors the child location information and generates an alert if the system determines that the child moves outside of a boundary region (with the boundary region being established as a predetermined or selected distance from the home or DSRC radio or mobile device or via selected geographical coordinates (such as the coordinates of a yard boundary or the like at the home) or other determined or selected boundaries or distances, depending on the particular application. Optionally, the DSRC radio 53 may be integrated into the mobile device 54, whereby the monitoring and alert system monitors the location of the child and provides an alert when the child moves outside of a distance range from the mobile device, which may be useful in situations where a parent and child go to a park or other location remote from the home.

The present invention thus may utilize a home communication system for tracking a child at or near the home and for providing updated or real time information to the user or parent about the child's location, such as via a communication to the user's or parent's smart phone or optionally via a communication to a telematics system of the vehicle or the like. Thus, a parent may be able to monitor the location of their child at or near the home and may be alerted when the child moves outside of a predetermined range from the home, such as for situations when the parent is inside the home (or briefly away from the home) and not watching the child directly.

In the systems described above that utilize a camera, the camera or sensor may comprise any suitable camera or sensor. The system may include an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/1581 67; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

Optionally, the vision system (utilizing a forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/075250; WO 2013/019795; WO 2012-075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. An alert system for a vehicle for alerting an occupant of the vehicle that a pedestrian or bicyclist is approaching the vehicle and may collide with a vehicle door if the door is opened, said alert system comprising:

a communication device carried by a pedestrian or bicyclist and operable to communicate information regarding location and motion of said communication device;

a receiver at the vehicle that receives a communication from said communication device;

a processor that processes information communicated in the communication;

wherein said processor, responsive to processing communicated information, determines whether or not the location and motion of said communication device relative to the vehicle is indicative of a hazardous condition;

wherein said alert system, responsive to said processor determining that there is a potential hazardous condition, generates an alert to the occupant of the vehicle;

wherein said alert system is responsive to a door lock status of the vehicle door, and wherein said alert system, responsive to the door lock status being indicative of the vehicle door being locked, does not generate an alert irrespective of determination of a potential hazardous condition; and a side sensing device disposed at a side of the vehicle and operable to capture data, wherein data captured by said side sensing device is processed to determine a presence or approach of a pedestrian or bicyclist at the side of the vehicle and rearward of the vehicle, and wherein data captured by said side sensing device is combined with information communicated in the communication received from said communication device, and wherein the combined data and information are processed to provide enhanced confidence of determination of a potential hazardous condition, and wherein said side sensing device comprises one of a side camera capturing image data and a side radar sensor capturing radar data.

2. The alert system of claim 1, wherein said communication device comprises a mobile device carried by the pedestrian or bicyclist.

3. The alert system of claim 2, wherein said mobile device comprise a smart phone.

4. The alert system of claim 1, wherein said alert system is operable to inhibit opening of a vehicle door responsive to a determination of a hazardous condition.

5. The alert system of claim 1, wherein said side sensing device comprises a side radar sensor that captures radar data and wherein captured radar data is combined with information communicated by said communication device to provide enhanced confidence of determination of a potential hazardous condition.

6. The alert system of claim 5, wherein said side sensing device comprises a side camera that captures image data and wherein captured image data is combined with information communicated by said communication device to provide enhanced confidence of determination of a potential hazardous condition.

7. The alert system of claim 1, wherein the communication device comprises a mobile dedicated short range communication device and wherein said receiver comprises a receiver for a vehicle-based dedicated short range communication device.

8. The alert system of claim 1, wherein said communication device comprises a mobile processor operable to determine the geographical location of said communication device and motion of said communication device.

9. The alert system of claim 8, wherein said mobile processor of said communication device, responsive to determining the geographical location and motion of said communication device, controls a dedicated short range communication device associated with said communication device to communicate information to said receiver at the vehicle.

10. The alert system of claim 1, wherein said communication device receives information communicated by a home monitoring device and wherein the information communicated by said home monitoring device comprises information pertaining to a geographical location of a second communication device at or near said home monitoring device that communicates geographical location information to said home monitoring device.

11. An alert system for a vehicle for alerting an occupant of the vehicle that a pedestrian or bicyclist is approaching the vehicle and may collide with a vehicle door if the door is opened, said alert system comprising:

a mobile communication device carried by a pedestrian or bicyclist and operable to communicate information regarding location and motion of said mobile communication device, wherein said mobile communication device comprises a mobile dedicated short range communication radio;

wherein said mobile communication device comprises a mobile processor operable to determine the geographical location of said mobile communication device and motion of said mobile communication device;

a receiver at the vehicle that receives a communication from said mobile communication device, wherein said receiver comprises a receiver of a vehicle-based dedicated short range communication radio;

a processor that processes information communicated in the communication;

wherein said processor, responsive to processing communicated information, determines whether or not the location and motion of said mobile communication device relative to the vehicle is indicative of a hazardous condition;

wherein said alert system, responsive to said processor determining that there is a potential hazardous condition, generates an alert to the occupant of the vehicle;

wherein said alert system is responsive to a door lock status of the vehicle door, and wherein said alert system, responsive to the door lock status being indicative of the vehicle door being locked, does not generate an alert irrespective of determination of a potential hazardous condition; and a camera disposed at the vehicle and having a field of view sideward and/or rearward of the vehicle so as to encompass a side region of the vehicle, wherein image data captured by said camera is processed to determine a presence or approach of a pedestrian or bicyclist at the side and rearward region, and wherein said alert is generated at least in part responsive to said processing of captured image data determining that there is a potential hazardous condition, and wherein captured image data is combined with information communicated by said mobile communication device to enhance determination of a potential hazardous condition.

12. The alert system of claim 11, wherein said mobile communication device comprises a smart phone and wherein said mobile dedicates short range communication radio is integrated in said smart phone.

13. The alert system of claim 11, wherein said alert system is operable to inhibit opening of a vehicle door responsive to a determination of a hazardous condition above a threshold level.

14. The alert system of claim 11, wherein said mobile communication device receives information communicated by a home monitoring device and wherein the information communicated by said home monitoring device comprises information pertaining to a geographical location of a second communication device at or near said home monitoring device that communicates geographical location information to said home monitoring device.

15. An alert system for a vehicle for alerting an occupant of the vehicle that a pedestrian or bicyclist is approaching the vehicle and may collide with a vehicle door if the door is opened, said alert system comprising:

a mobile device carried by a pedestrian or bicyclist and operable to communicate information regarding location and motion of said mobile device;

wherein said mobile device comprises a mobile processor operable to determine the geographical location of said mobile device and motion of said mobile device;

wherein said mobile device comprises a mobile dedicated short range communication device;

a receiver at the vehicle that receives a communication from said mobile device, wherein said receiver comprises a receiver for a vehicle-based dedicated short range communication device;

a side sensing device disposed at a side of the vehicle and having a field of sensing sideward and/or rearward of the vehicle so as to encompass a side region of the vehicle;

a processor that processes information communicated in the communication and data captured by said side sensing device;

wherein data captured by said side sensing device is processed to determine a presence or approach of a pedestrian or bicyclist at the side of the vehicle and rearward of the vehicle;

wherein said processor, responsive to processing communicated information, determines whether or not the location and motion of said mobile device relative to the vehicle is indicative of a hazardous condition;

wherein said processor, responsive to processing captured data, provides enhanced confidence of the determination of a potential hazardous condition;

wherein said alert system, responsive to said processor determining, via processing communicated information and captured data, that there is a potential hazardous condition, generates an alert to the occupant of the vehicle;

wherein said alert system is responsive to a door lock status of the vehicle door, and wherein said alert system, responsive to the door lock status being indicative of the vehicle door being locked, does not generate an alert irrespective of determination of a potential hazardous condition; and wherein captured data is combined with information communicated by said mobile device to enhance determination of a potential hazardous condition.

16. The alert system of claim 15, wherein said alert system is operable to inhibit opening of a vehicle door responsive to a determination of a hazardous condition.

17. The alert system of claim 15, wherein said mobile device receives information communicated by said home monitoring device and wherein the information communicated by said home monitoring device comprises information pertaining to a geographical location of a second mobile dedicated short range communication device at or near said home monitoring device that communicates geographical location information of the second mobile dedicated short range communication device to said home monitoring device.

* * * * *